United States Patent [19]

Jenkner

[11] Patent Number: 5,079,393
[45] Date of Patent: Jan. 7, 1992

[54] CONTROL DEVICE FOR STOPPING PLATE SAWS

[76] Inventor: Erwin Jenkner, Lindenstrasse 13, Gechingen, Fed. Rep. of Germany, D-7261

[21] Appl. No.: 465,029

[22] Filed: Jan. 16, 1990

[30] Foreign Application Priority Data

Jan. 20, 1989 [DE] Fed. Rep. of Germany ....... 3901538

[51] Int. Cl.⁵ .................... H01H 3/20; H01H 15/00
[52] U.S. Cl. ................................. 200/332; 200/47; 200/334; 83/701; 74/491
[58] Field of Search ................. 200/330–332, 200/333–334, 337–338, 332.1, 329, 574, 47, 332.2, 335–336; 83/701; 74/491

[56] References Cited

U.S. PATENT DOCUMENTS

| | | |
|---|---|---|
| 2,255,706 | 9/1941 | Height .................... 200/47 |
| 3,693,773 | 9/1972 | Wickham et al. .......... 200/47 |
| 4,356,369 | 10/1982 | Hostetler et al. ............ 200/332 |
| 4,358,651 | 11/1982 | Hostetler et al. ............ 200/332 |
| 4,359,615 | 11/1982 | Meyerhoefer et al. ....... 200/330 |

OTHER PUBLICATIONS

Product Brochure, Holzma Maschinenbau GmbH, Titled "Panel Cutter HPP 01", Dated May, 1987.

*Primary Examiner*—Renee S. Luebke
*Assistant Examiner*—Keith Kupferschmid
*Attorney, Agent, or Firm*—Dick and Harris

[57] ABSTRACT

A control device for stopping and/or starting plate saws, for a plate saw having at least one workpiece support table operably associated therewith. An actuation member is provided which is accessible to an operator positioned adjacent the workpiece support table or behind it, or between two or more tables. The actuation member is a bar-shaped member, rotatably supported about an axis extending beneath and parallel to a longitudinal edge of a table surface of one of the workpiece support tables.

4 Claims, 2 Drawing Sheets

CONTROL DEVICE FOR STOPPING PLATE SAWS

BACKGROUND OF THE INVENTION

The present invention relates to control devices for stopping and/or starting plate saws, and in particular to a control device for stopping and/or starting plate saws which is operably associated with a plate saw having a workpiece platform with at least one workpiece support table or two or more positioned and spaced in parallel relationship to each other, which control device has an actuation member which can be actuated by an operator, who may be standing at any position adjacent or between the workpiece support table(s), or at a position next to the rear-facing side of one of the workpiece support tables.

Plate saws are conventionally controlled by means of a control panel, which is typically positioned somewhere on the side of the plate saw where the human operator stands. The control panel is typically positioned on a bracket arm. Such a panel saw having a control panel is disclosed in the brochure of the firm, Holzma Maschinenbau GmbH, which is entitled "PANEL CUTTER HPP 01", of May, 1987. If such plate saws for the cutting of workpiece plates are then equipped with a workpiece feeding platform, or with a workpiece feeding device and a workpiece transfer platform, in order to feed and cut up large-format workpiece plates, then the control panel can only be used as long as the operator is able to reach the control panel from a position between the two workpiece support tables.

However, if one wishes to be able to turn the plate saw off (or on) from a position behind the workpiece feeding or transfer platform, or at a greater distance from the control panel between the workpiece support tables, the plate saw is then generally equipped with an additional switching device in the form of a foot pedal, located below the workpiece feeding or transfer platform, which foot pedal is connected in an operable manner with the plate saw by a cable. The foot pedal will then be brought by the operator into whatever operating position would be most convenient for the operator at that time. It is readily apparent that the location of the foot pedal relative to the plate saw can and will change constantly in the course of the operation of the plate saw. Accordingly, each operator must locate, and reposition the foot pedal as necessary, before the pedal may be used in the operation of the plate saw. In the event of an emergency, the foot pedal may not be readily accessible by the operator, which could result in a potentially dangerous delay in the actuation of the switch.

Accordingly, it is an object of the present invention to avoid this disadvantage and provide a control device for stopping (or starting) plate saws, which can be reached and actuated from any position between the workpiece support tables, as well as from the rear side of at least one of the workpiece support tables.

This and other objects of the invention will become apparent in light of the present specification, drawings and claims.

SUMMARY OF THE INVENTION

The present invention comprises a control device for stopping and/or starting plate saws, which is operably connected to a plate saw having a workpiece platform with at least one workpiece support table. In a preferred embodiment, two or more workpiece tables are positioned in spaced parallel relation to each other. Each of the at least two workpiece support tables has a table surface with at least one longitudinal edge. The control device is further of the kind which has an actuation member which is accessible to an operator positioned at any location between the least two workpiece support tables. The actuation member is further accessible from a rear-facing side of one of the at least two workpiece support tables. The control device is further operably affixed to one of the at least two workpiece support tables. The actuation member of the control device is operably disposed beneath a table surface of at least one of the workpiece support tables and is arranged substantially parallel to the longitudinal edge of the table surface. The actuation member is further movable into a plurality of positions relative to the table surface, including an actuating position. The actuation member, when in the actuating position, is closer to the longitudinal edge of the table surface than when the actuation member is in any other of the plurality of positions. Although the invention would typically be used as a control device for stopping plate saws, such as in an emergency, and requiring restarting of the plate saw at a control panel, the device might alternatively be configured to permit restarting of the saw as well.

The invention may take the form of a taut cable strung beneath one of the workpiece support tables, whereby pulling of the cable causes the tripping of a switch operably associated with the panel saw to interrupt its operation.

In a preferred embodiment of the invention, the actuation member is configured in the shape of a bar. The actuation member is operably arranged for rotation about an axis disposed in parallel, spaced relationship with the longitudinal edge of the table surface. In a preferred embodiment of the invention, the actuation member is pivotable around the axis upwardly, relative to the longitudinal edge of the table surface.

The arrangement of the control device in accordance with the present invention, on the workpiece feeding or transfer platform, and the construction and arrangement of the actuation member on one or more of the workpiece supporting tables, ensures that the actuation member can be grasped or activated, at any time and from any position by an operator standing between the workpiece support tables, or at a greater distance from the operating control panel between the workpiece support tables. At the same time however, no switching process can be triggered by the mere downward pushing of the actuation member as might occur from inadvertent operator contact. An operator is thus in a position to immediately switch off a plate saw in the event of an emergency.

DETAILED DESCRIPTION OF THE DRAWINGS

Figure 1:
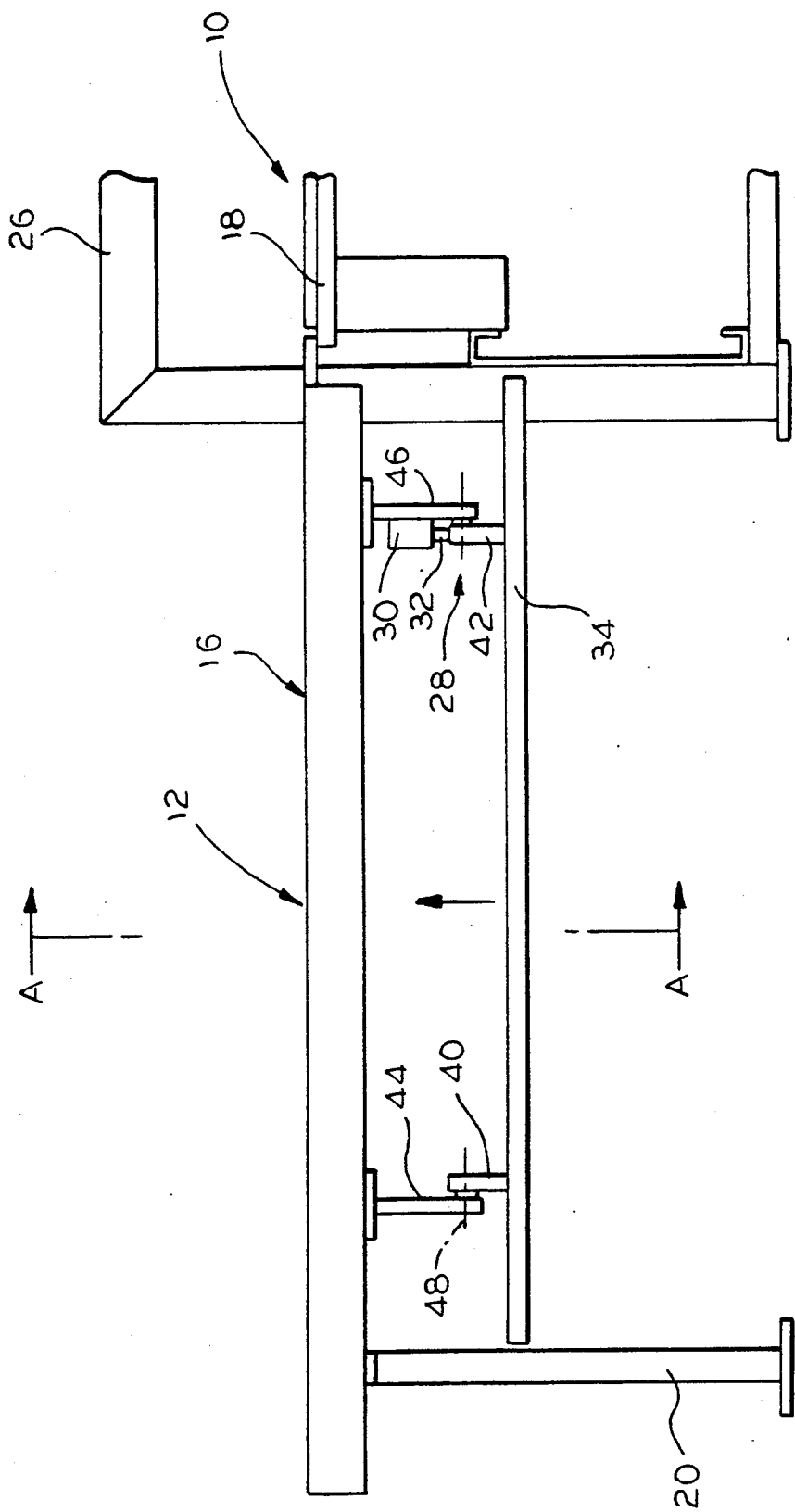
FIG. 1 is a partial side elevation, taken along line 1—1 of FIG. 2, of a table surface of a workpiece feeding or transfer platform, which is connected in series, upstream or downstream from a plate saw, which plate saw is equipped with a control device in accordance with the present invention.

While this invention is susceptible of embodiment in many different forms, there is shown in the drawings and will herein be described in detail, a specific embodiment, with the understanding that the present disclosure is to be considered as an exemplification of the principles of the invention and is not intended to limit the invention to the embodiments illustrated.

FIG. 1 shows a portion of plate saw 10, in a partial side elevation. Workpiece platform 12 is operably arranged, on the side of the plate saw 10 where operator handling of workpiece plates is performed. Workpiece platform 12 can either be a workpiece feeding platform for the feeding of a plate-shaped workpieces into plate saw 10, or a workpiece transfer platform, onto which accumulating plate parts, such as workpiece plates which are being cut up in program controlled manner, are placed. In the latter case, the feeding of such workpiece plates takes place by means of a workpiece feeding device (not shown), which is built into the side of plate saw 10 and positioned opposite to workpiece platform 12.

Figure 2:
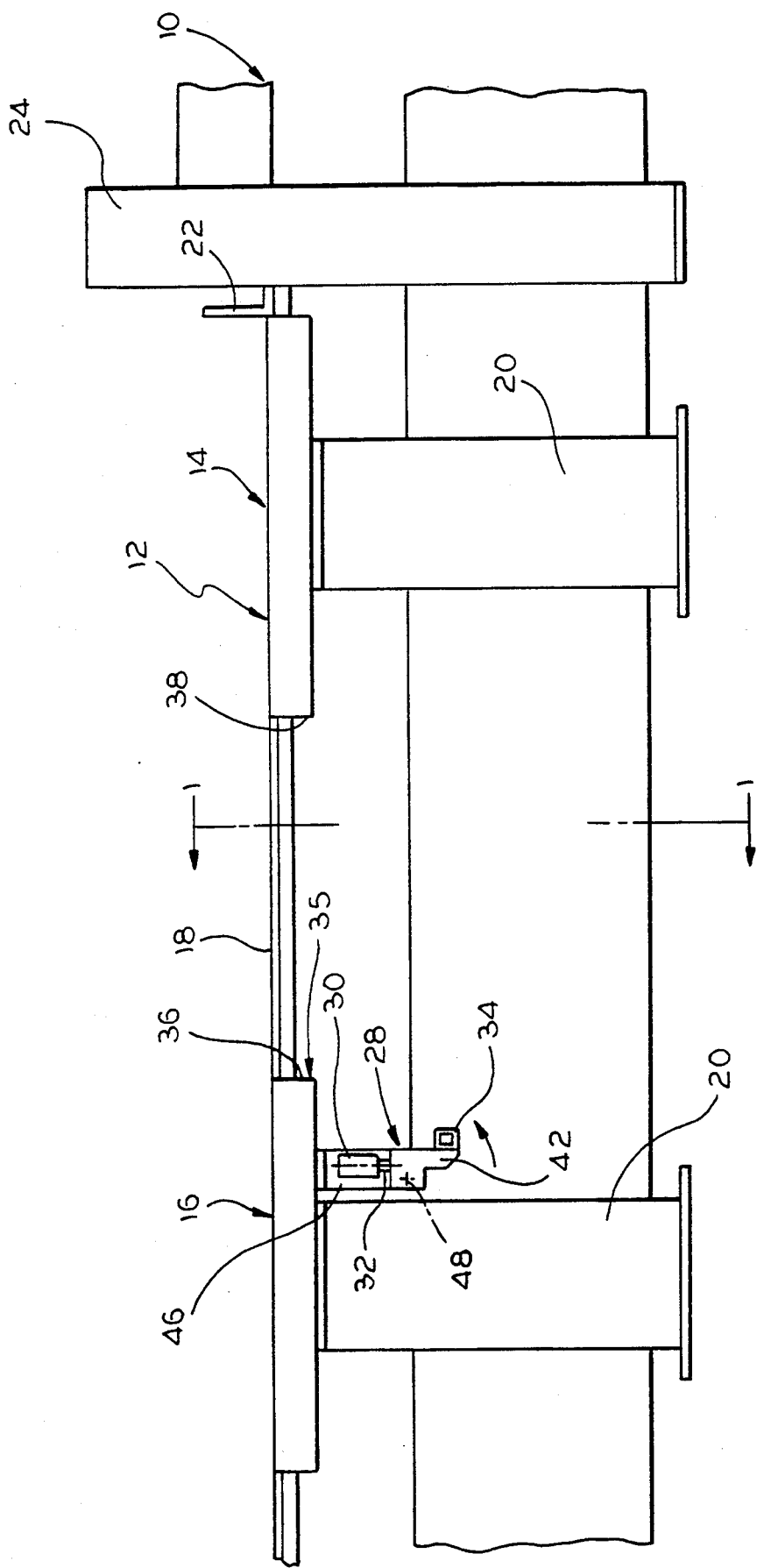
FIG. 2 is an elevation of the workpiece feeding or transfer platform, taken along line A—A of FIG. 1.

Workpiece platform 12 typically has, for example, two workpiece support tables 14 and 16, respectively, which are positioned in parallel, spaced relationship to each other, as can be seen in FIG. 2. Each one of workpiece support tables 14 and 16 is supported at one end by machine platform 18 of plate saw 10, and at an opposite end by support column 20. Each workpiece support table, such as for example workpiece support table 14, has disposed along a side thereof a side stop, such as side stop 22, as seen in FIG. 2. Plate saw 10 is supported at its ends by side frame members 24 and 26 respectively, as seen in FIGS. 1 and 2. An operating control panel (not shown) for the saw may be positioned atop side frame member 24.

Control device 28 is operably arranged beneath workpiece platform 12 and operably connected to plate saw 10. Control device 28 is constructed and positioned in such a manner that it can be rapidly and securely actuated from any position by the operator, so long as the operator is positioned between the two workpiece support tables 14 and 16. For this purpose, control device 28 is installed, for example, beneath workpiece platform 12, below workpiece support table 16. Control device 28 includes stationary electrical switching unit 30, switching element 32 of which can be actuated by means of an actuation member 34. Actuation member 34 is preferably fabricated as a bar-shaped member, formed from a hollow tube, which is positioned below workpiece support table 16 parallel to longitudinal edge 35 of table surface 36.

Bar-shaped actuation member 34 extends, as seen in FIG. 1, essentially along the entire length of, and parallel to, workpiece support table 16, and must be raised in order to actuate stationary electrical switching unit 30. Actuation member 34 is supported in a pivotable manner through two support brackets 40 and 42, which are disposed at a distance from each other, on corresponding support blocks 44 and 46 respectively, which are attached to the lower side of workpiece support table 16. Electrical switching unit 30 is attached to support block 46 in such a manner that electrical switching unit 30 can be actuated by support bracket 42, when bar-shaped actuation member 34 is pivoted about axis 48 which extends through cooperating support brackets 40, 42 and support blocks 44, 46 respectively, in the direction of the arrow, as seen in FIG. 2. For example, switching element 32 may be a downward-biased member, which is driven upward, as actuation member 34 is upwardly pivoted, relative to longitudinal edge 35 of workpiece support table 16. In particular, when actuation member 34 is pulled in the direction of the arrow in FIG. 2, the top, left edge of bracket 42 (as seen in FIG. 2) is moved upwardly, pressing upwardly against switch 32. When switching element 32 is driven upward it interrupts the flow of power to the saw and shuts off the saw.

In a preferred embodiment of the invention, switch 32 is so connected to the control of the saw so that while a first lifting of actuation member 34 interrupts the operation of the running saw, actuation member 34 is then returned to its first, lowered position, and a subsequent lifting of actuation member 34 will restart the saw. In an alternative embodiment, restarting might only be accomplished at the control panel (not shown).

As a result of the present construction, after bar-shaped actuation member 34 has been raised upwardly to actuate control device 28, actuation member 34 automatically moves back to its original lower position, as seen in FIGS. 1 and 2. In that position, no actuation of control device 28 can be caused by means of inadvertent contact, for example, by the knee of an operator, in the event the operator should happen to bend over or otherwise approach workpiece support table 16. Furthermore, actuation member 34 can be handled quickly and securely from any operating position between workpiece support tables 14 and 16, in order to switch plate saw 10 off.

If workpiece platform 12 should include, for example, three or more workpiece support tables provided in spaced, parallel relationship to each other, then it is clear that a control device 28 of the type illustrated can be provided between every two workpiece support tables which are positioned adjacent to each other. Further, and in accordance with the previously described embodiment, both workpiece support tables 14 and 16 could be equipped with one control device 28 each.

The foregoing description and drawings merely explain and illustrate the invention and the invention is not limited thereto except insofar as the appended Claims are so limited, as those skilled in the art having the disclosure before them will be able to make modifications and variations therein without departing from the scope of the invention.

What is claimed is:

1. A control device for stopping and restarting plate saws, operably associated with a plate saw having a workpiece platform with at least two workpiece support tables positioned in spaced parallel relationship to each other, wherein a first actuation of said control device from a first position to an actuation position causes interruption of operation of said plate saw and subsequent return to said first position and a second actuation of said control device from said first position to said actuation position causes resumption of operation of said plate saw, each of said at least two workpiece support tables having a table surface with at least one longitudinal edge, said control device further comprising:

said control device having an actuation member which is accessible to an operator positioned at any location between said at least two workpiece support tables, said actuation member further being accessible from a rear facing side of at least one of said at least two workpiece support tables;

said control device being operably arranged for rotation about an axis disposed in parallel, spaced relation to said longitudinal edge of said table surface;

said actuation member being pivotable, around said axis, upwardly, relative to said longitudinal edge of said table surface;

said actuation member being movable into a plurality of positions relative to said table surface, including said actuation position, said actuation member, when in said actuation position, being closer to said longitudinal edge of said table surface, than when said actuation member is in any other of said plurality of positions.

2. The control device according to claim 1 wherein said actuation member further comprises:

a bar, having a longitudinal axis extending substantially parallel to said longitudinal edge of said table surface, said bar further extending substantially coextensively with said longitudinal edge.

said bar being disposed in spaced, parallel relation to said axis and operably arranged for pivotal movement around said axis.

3. A control device for stopping and restarting plate saws, operably associated with a plate saw having a workpiece platform with at least two workpiece support tables positioned in spaced, parallel relationship to each other, each of said at least two workpiece support tables having a table surface with at least one longitudinal edge, said control device further comprising:

a bar, operably affixed to at least one of said at least two workpiece support tables, said bar being further operably suspended beneath the surface of said at least one of said at least two workpiece support tables, said bar being further disposed in spaced, parallel relation to said longitudinal edge and having a longitudinal axis extending parallel to said longitudinal edge and extending substantially coextensively thereto, said bar further being configured for rotation about a second axis extending substantially parallel to said longitudinal edge and beneath said at least one of said at least two support tables; and switching means operably associated with said bar and said panel saw such that, upon a lifting actuation movement of said bar, the plate saw is stopped if running.

4. The control device according to claim 3 wherein the plate saw is restarted if stopped upon lifting actuating movement of said bar.

* * * * *

UNITED STATES PATENT AND TRADEMARK OFFICE
CERTIFICATE OF CORRECTION

PATENT NO. : 5,079,393

DATED : January 7, 1992

INVENTOR(S) : Erwin Jenkner

It is certified that error appears in the above-identified patent and that said Letters Patent is hereby corrected as shown below:

| | |
|---|---|
| Col. 5, Line 4 | After Line 3 and before Line 4, insert the following paragraph --said control device being operably affixed to at least one of said two workpiece support tables;--. |
| Col. 5, Line 4 | Delete "control device" and instead insert --actuation member--. |
| Col. 5, Line 22 | Delete "edge." and instead insert --edge,--. |

Signed and Sealed this

Twentieth Day of July, 1993

*Attest:*

MICHAEL K. KIRK

*Attesting Officer*     *Acting Commissioner of Patents and Trademarks*